United States Patent
Svensson et al.

[15] 3,658,599
[45] Apr. 25, 1972

[54] METHOD AND APPARATUS FOR INITIATING GAS SCARFING

[72] Inventors: Sven Erik Svensson, Gavle; Per-Lennart Lonngren, Stockholm, both of Sweden

[73] Assignee: AGA Aktiebolag, Lidingo, Sweden

[22] Filed: May 14, 1969

[21] Appl. No.: 824,602

[30] Foreign Application Priority Data

May 16, 1968 Sweden..................................6631/68

[52] U.S. Cl..................................................148/9.5, 219/69
[51] Int. Cl. ........................................B23k 7/00, B23k 7/06
[58] Field of Search........................148/9.5; 219/69 R, 69 G; 266/23 H

[56] References Cited

UNITED STATES PATENTS

| | | |
|---|---|---|
| 2,309,096 | 1/1943 | Bucknam et al..........................148/9.5 |
| 2,381,355 | 8/1945 | Laughton, Jr..........................219/69 R |
| 2,513,425 | 7/1950 | Lobosco..................................148/9.5 |

FOREIGN PATENTS OR APPLICATIONS

| | | |
|---|---|---|
| 610,350 | 10/1948 | Great Britain..........................148/9.5 |
| 1,429,840 | 1/1966 | France....................................148/9.5 |

*Primary Examiner*—Delbert E. Gantz
*Attorney*—Larson, Taylor & Hinds

[57] ABSTRACT

A method for initiating the gas scarfing process during the high velocity movement of the workpiece to be scarfed relative to the scarfing machine wherein a consumable metal electrode is melted as it is fed toward the workpiece to form a deposit of the metal at a selected position along the workpiece. The electrode is also rotated toward the workpiece at a speed approximately equal to the speed at which the relative movement between the workpiece and the scarfing machine takes place so as to control the formation of the metal deposit.

6 Claims, 5 Drawing Figures

METHOD AND APPARATUS FOR INITIATING GAS SCARFING

FIELD OF THE INVENTION

The present invention relates to a method for initiating a gas scarfing process of the type wherein there is high velocity relative movement between the workpiece and the scarfing machine and to an apparatus for carrying out the method.

BACKGROUND OF THE INVENTION

In many gas scarfing processes it has been necessary to terminate the relative movement between the workpiece and the scarfing machine in order to obtain sufficient heating of the workpiece to permit initiation of the scarfing process. For example, initiation of the gas scarfing process has been achieved through the heating of the workpiece with an electric arc drawn between a carbon electrode and the workpiece. This general approach has a number of serious disadvantages particularly in the gas scarfing of workpieces which have a number of defects distributed over the surface to be scarfed in that such an approach is obviously quite time-consuming.

A more recent development in the scarfing process designed to improve the capacity of scarfing machines involves the so-called "flying start" technique for initiating gas scarfing wherein a powder is added for igniting the scarfing gas, for example, oxygen. Although this approach provides a generally effective method for achieving a flying start in initiating the gas scarfing process, this approach has the serious drawbacks that the scarfing machine is rendered more complicated because of the additional equipment required for supplying the powder. Further, to ensure that the initiation of the scarfing process takes place at a fixed position along the workpiece, the powder must necessarily be preheated. Additionally, the use of powder necessitates the removal of the additional slag formed by the powder. Yet another disadvantage of this approach is that a great deal of the powder used actually does not take part in the process but is blown about in the factory itself and thus creates ventilation problems and in many instances requires the installation of a suitable high capacity ventilating system.

SUMMARY OF THE PRESENT INVENTION

In accordance with the present invention a method for initiating gas scarfing is provided which produces a flying start at feeding velocities suitable for gas scarfing and which avoids the various disadvantages of the prior art discussed hereinabove. In accordance with the method of the invention a consumable electrode is moved toward the workpiece and a portion thereof is melted onto a selected position on the workpiece during the movement of the workpiece relative to the gas scarfing machine, the metal so deposited having a sufficiently high temperature to enable ignition thereof in the scarfing gas. The electrode is fed toward the workpiece and the electrode holder is rotated toward the workpiece at a speed approximately equal to the speed at which the relative movement between the workpiece and the scarfing machine takes place so that the positioning of the deposit along the workpiece may be controlled.

In accordance with a presently preferred embodiment of the invention an arrangement for initiating the scarfing process comprises the consumable electrode and means for moving the electrode relative to the workpiece so that melting of a portion of the electrode causes the formation of a deposit of the electrode material at a selected position along the workpiece. These latter means include a pivotable support or holder for the electrode and a device for producing rotative movement of the holder, a device for feeding the electrode, an electrical circuit for controlling melting of the electrode and a valve control device for the gas supply. The arrangement further includes a control circuit for causing feeding of the electrode toward the workpiece simultaneously with the energization of the electrical circuit for controlling the melting of the electrode and with the initiation of the rotative or pivoting motion of the electrode holder and for controlling the gas supply valve control device such that the gas stream is started simultaneously with the return of the electrode holder to the initial position thereof.

Other features and advantages of the present invention will be set forth in or apparent from the description of preferred embodiments of the invention found hereinbelow.

DESCRIPTION OF THE PREFERRED EMBODIMENTS

Figure 1A:
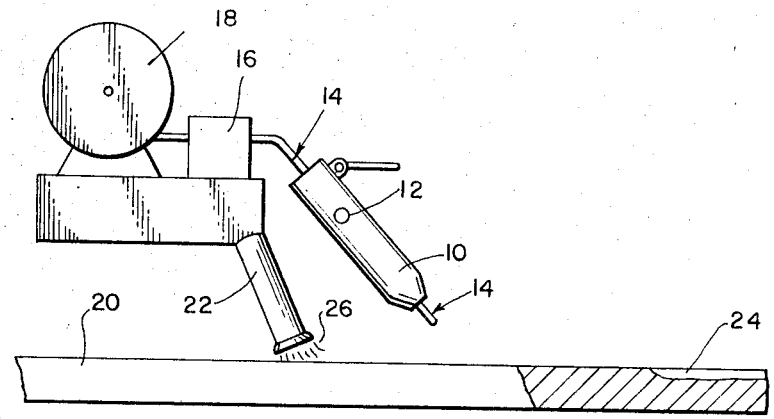
FIGS. 1a, 1b, and 1c are schematic representations of a scarfing machine in accordance with a presently preferred embodiment of the invention illustrating operation of the scarfing machine at various stages.
Figure 1B:
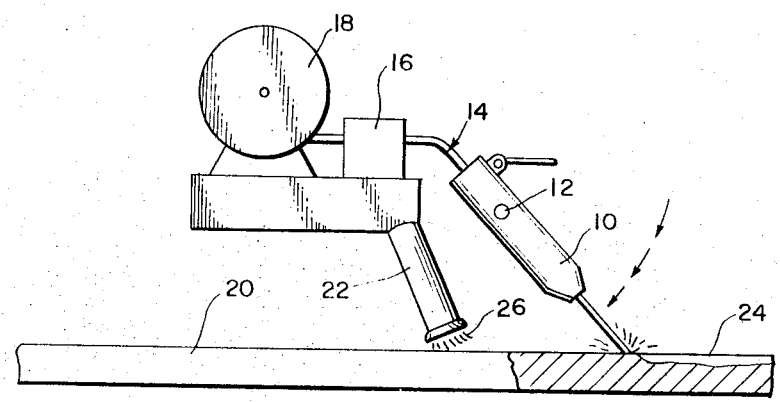
Figure 1C:
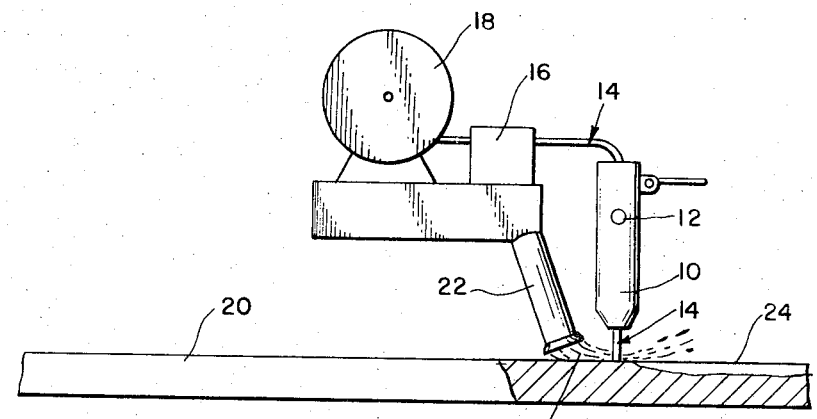

Referring to FIGS. 1a, 1b and 1c a scarfing machine is shown which includes an electrode holder 10 which is pivoted about a point denoted 12 and through which is fed an electrode 14. Electrode 14 is fed by a feeding device indicated at 16 from a suitable storage device denoted 18. Electrode 14, electrode holder 10, feeding device 16 and storage device 18 are all mounted on a carriage (not shown) which is adapted for movement alongside a workpiece 20. A gas burner 22 is also mounted on this carriage in a position rearward of the electrode holder 10. Workpiece 20 is shown in partial section to reveal a defect denoted 24 in the material thereof.

Although the embodiment of the invention shown in FIGS. 1a, 1b and 1c will be discussed relative to an arrangement wherein the carriage is movable alongside a fixed workpiece, the invention is not limited to such an arrangement. It will be appreciated that the various elements described hereinabove may be mounted on a fixed machine and the workpiece moved relative thereto. The machine itself may include a plurality of gas burners corresponding to burner 22 and associated electrodes corresponding to electrode 14, the burners and associated electrode being arranged in side by side relationship to permit treatment of workpieces of varying widths. The burners and associated electrodes may also be arranged so as to permit working on several sides of a workpiece at one time or, with cylindrical or other rounded workpieces, around the entire periphery of the workpiece. Each burner and associated electrode is controllable independently of the other burners and electrodes so as to permit gas scarfing of ingots which have a number of localized defects distributed over the entire surface thereof.

Referring to FIG. 1a, the initial position of burner 22 and associated electrode 14 is shown. At this time the defect 24 in the workpiece 20 is registered either directly by operator or automatically by a suitable detector device (not shown). The carriage moves at high velocities along the workpiece and thus it is necessary for the operator to initiate operation of the scarfing machine at a predetermined time before the carriage arrives at defect 24. This requirement, of course, also applies where automatic sensing of defects in the workpiece 24 is utilized.

Referring to FIG. 1b, a moment immediately after the operation of the machine has begun is shown. Operation is begun by the depressing of a start button (not shown) to initiate feeding of electrode 14 from storage device 18 by feeding device 16, the electrode 14 being fed into contact with the workpiece 20 immediately in front of the defect 24. For the exemplary embodiment under consideration, the electrode is assumed to be melted off by means of resistance heating as well as arc heating. It will be appreciated that other arrangements for melting the electrode 14 may be used such as an induction heating device. Simultaneously with the feeding of the electrode 14 toward the workpiece 20, and electric circuit (discussed hereinbelow) for initiating the arc is completed and the electrode holder 10 is caused to pivot about point 12 at a speed proportional to the speed of relative movement between the carriage and the workpiece 20. The tip of electrode 14 melts and collects at a predetermined position along the workpiece to form a deposit of high temperature metal in front of defect 24.

Referring to FIG. 1c, there is shown a completed deposit of metal serving to ignite a stream of gas such as oxygen. When the electrode holder 10 has reached the position shown the feeding of electrode 14 is stopped and the oxygen stream is started. The electrode holder 10 is rapidly rotated away from the workpiece 20 and returns to the initial position at approximately the same time as the oxygen stream begins the scaring operation. The stream of oxygen is started gradually to avoid tipping of the workpiece 20 and the workpiece is preheated in a conventional manner such as by heating flames 26 from burner 22. As the carriage approaches the end of defect 24 the stream of oxygen is cut off and the burner arrangement is readied in the event that further defects are encountered along the path of travel thereof along the workpiece 20.

Figure 2:
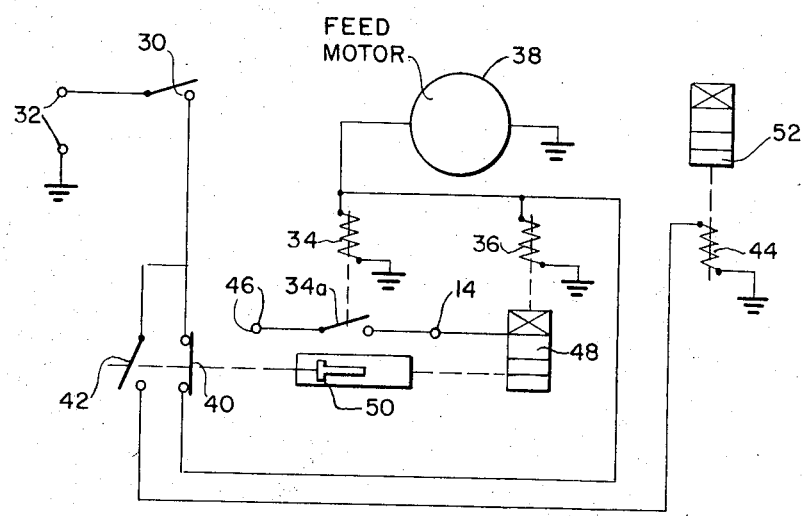
FIG. 2 shows a schematic circuit diagram of an electrical control arrangement for the scarfing machine in accordance with one embodiment of the invention.

Referring to FIG. 2, one embodiment of an electro-pneumatic control system for the scarfing machine described hereinabove is shown. The system includes a start contact 30 which may be pushbutton operated and which is connected to a source of electrical energy 32. Contact 30 completes a circuit between source 32 and a pair of relay coils 34 and 36 and a feed motor 38 for controlling feeding device 16 of FIGS. 1a, 1b and 1c, through a pneumatically actuated contact 40. Contact 30 also connects source 32 to a further relay coil 44 through a parallel circuit including a second pneumatically actuated contact 42. Relay coil 34 controls operation of a relay contact 34a which is connected in a D.C. circuit including a D.C. source 46, which may be a converter, and electrode 14 discussed hereinabove. Relay coil 36 controls a valve 48 which in turn controls movement of a pneumatic cylinder 50. Movement of cylinder 50 in turn controls the rotative movement of electrode holder 10 in the manner described hereinabove such that holder 10 is rotated toward and away from workpiece 20. Cylinder 20 also controls actuation of contacts 40 and 42. Relay coil 44 controls a valve 52 which acts to control the supply of scarfing gas.

Considering the initiation of a scarfing process wherein a control system such as shown in FIG. 2 is employed and considering that D.C. supply 46 is energized and movement of the carriage (not shown) has begun, operation is begun through depressing of contact 30 so that the circuits controlled thereby are closed. Closing of contact 30 enables a pulse from source 32 to be supplied to relays 34 and 36 and to feed motor 38 to cause energization thereof. Energization of relay 34 causes closing of contact 34a and completion of the circuit between D.C. supply 46 and electrode 14 so that melting of electrode 14 is initiated. Simultaneously current is supplied to valve 48 to cause actuation of cylinder 50 and consequent rotation of electrode holder 10 downwardly toward workpiece 20 as described hereinabove. Prior to closing of switch contact 30 pneumatically actuated contact 40 is closed and pneumatically actuated contact 42 is open as shown in FIG. 2. Movement of piston cylinder 50, coupled to contacts 40 and 42 as is indicated in dashed lines in FIG. 2, will, when the piston of cylinder 50 has reached a position corresponding to the position of electrode holder 14 in FIG. 1c, cause opening of contact 40 and closing of contact 42. With contact 40 open the electrode feed motor 38 is de-energized and the feeding of the electrode is terminated. Further, relay 34 is de-energized and the consequent opening of contact 34a causes opening of the circuit between D.C. source 46 and electrode 14 so that melting of the electrode is also terminated. A further effect of the opening of pneumatically actuated contact 40 is that relay coil 36 is also de-energized so that valve 48 controlled thereby will cause cylinder 50 to return to the initial position thereof. On the other hand, with pneumatically actuated contact 42 closed, source 32 is connected to relay coil 44 so that valve 52 is actuated to cause starting of the stream of oxygen for the scarfing operation. To interrupt the scarfing operation starting contact 30 is released and the circuit controlled thereby is opened so that pneumatically actuated contacts 40 and 42 return to the initial positions thereof and valve 52 is de-actuated to cut off the supply of oxygen.

Figure 3:
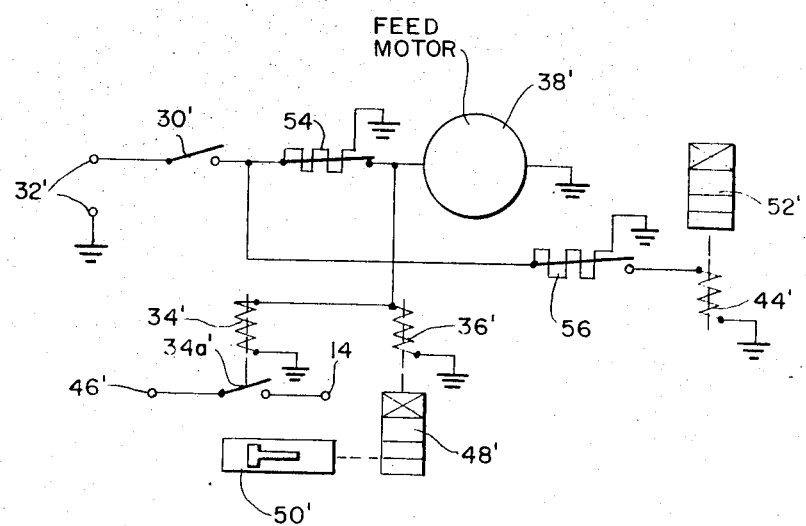
FIG. 3 shows a schematic circuit diagram in accordance with a second embodiment of the invention.

Referring to FIG. 3, a further embodiment of an electro-pneumatic control system in accordance with the invention is shown. The control system of FIG. 3 includes a number of elements corresponding to those of FIG. 2 and corresponding elements in FIG. 3 have been given the same identifying numbers with primes attached. Referring to FIG. 3, start contact 30' is connected to first and second adjustable timing relays 54 and 56, relays 54 and 56 being, for example, thermal type relays as indicated in FIG. 3. Relay 54 is connected to relay coils 34' and 36' and to feed motor 38' whereas relay 56 is connected to relay coil 44'.

It will be appreciated that the use of timing relays 54 and 56 permits elimination of pneumatically actuated contacts 40 and 42 and, further, provides a time dependence between the various operations in the process. It will be understood that it is not necessary to eliminate both contacts 40 and 42 and that either one of these contacts may be replaced by a corresponding timing relay 54 and 56.

Considering the operation of the control system of FIG. 3, the initial operation is similar to that described hereinabove regarding FIG. 2. Thus, when D.C. supply 46' is energized and movement of the carriage referred to has been begun, contact 30' is depressed completing the circuit between current supply 32' and relays 54 and 56. Under these conditions current will flow through relays 54 and 56 and through relay coils 34' and 36', relays 34' and 36' causing connection of electrode 14 to supply 46' through closing of switch 34a', and actuation of valve 48', respectively. Thus melting of electrode 14 and rotation of electrode holder 10 takes place in the same way as described hereinabove. After a predetermined time delay, timing relay 54 will cause opening of the connection between feed motor 38' and source 32' so that feed motor 38' is de-energized. Opening of relay 54 also causes de-energization of relays 34' and 36' and consequent termination of the current flow to electrode 14 and the de-actuation of control valve 48'. At approximately the same time, that is, after the same predetermined time period, relay 56 will cause closing of the circuit between source 32' and relay coil 44' and consequent actuation of valve 52' so that starting of a stream of oxygen takes place. To terminate the scarfing process start contact 30' is opened and the timing relays 54 and 56 return to the initial positions thereof so that valve 52' is de-actuated and the stream of oxygen controlled thereby is cut off.

In accordance with a third embodiment of the control system for the invention the timing relays 54 and 56 of FIG. 3 can be replaced by a single timing relay which controls first and second contacts, one for connecting relay coils 34' and 36' and feed motor 38' to source 32' and the second for connecting relay coil 44' to source 32'.

It will be appreciated from the foregoing that the oxygen scarfing method of the present invention provides a number of substantial advantages as compared with prior art techniques in that high scanning and scarfing speeds can be obtained without the necessity of the use of a starting powder such as described hereinabove. The advantages of the present invention will be clearly apparent from the table found hereinbelow. Considering this table it is noted that the values contained therein were obtained by experimental scarfing of cold workpieces with a machine in accordance with the invention as described hereinabove.

| | |
|---|---|
| Burner nozzle: | 1 aperture for oxygen $\phi$ 16 mm |
| | 10 apertures for preheating gas $\phi$ 1 mm |
| | angle relative to workpiece 75° |
| | elevation above workpiece 16 mm |
| AGA electrode: | SL 58, dimension $\phi$ 1.6 mm |

| | | |
|---|---|---|
| Relative speed between scarfing machine and workpiece | 6 m/min | 9 m/min |
| Electrode holder: initial angle relative to workpiece: | 45° | 45° |
| elevation above workpiece: | 50 mm | 50 mm |
| Electrode melt current | 360 A | 360 A |
| Pressure with starting flow of $O_2$ | 0.2 kg/cm² | 0.2 kg/cm² |
| Pressure of cutting stream of $O_2$ | 1.0 kg/cm² | 1.0 kg/cm² |
| Pressure of preheating oxygen at regulator | 5.0 kg/cm² | 5.0 kg/cm² |
| Pressure of acetylene at regulator | 1.5 kg/cm² | 1.5 kg/cm² |
| Groove cut into workpiece by one burner: width | 90 mm | 80 mm |
| depth | 6.5 mm | 4 mm |

It will be appreciated that much superior results will be obtained where the workpiece are heat-scarfed. It will also be understood that the present invention is not limited to the exemplary embodiments shown and described and that variations and modifications in the exemplary embodiments can be made without departing from the scope and spirit of the invention.

We claim:

1. A method for initiating a gas scarfing process wherein a deposit metal is formed at a selected point on the workpiece to be scarfed, said deposit having a sufficiently high temperature for enabling ignition thereof in the scarfing gas, said method comprising forming said deposit of metal by moving a consumable metal electrode in the direction of the relative movement between the workpiece and the gas scarfing machine so that said electrode maintains contact with said selected point during the movement of the workpiece relative to the machine and simultaneously melting a portion of said electrode onto said selected point on the workpiece.

2. A method as claimed in claim 1 wherein said electrode is moved toward the workpiece through a rotative motion and at a speed approximately equal to the speed of the relative movement between the workpiece and the scarfing machine, and the supply of electric current used in melting the electrode is interrupted at a time substantially simultaneous with the initiation of the gas stream.

3. A method as claimed in claim 2 wherein prior to initiation of the method the electrode is positioned at an angle with respect to the workpiece, and, upon initiation of the method, the electrode is fed toward the workpiece simultaneously with the energization of an electrical circuit for controlling the melting of the electrode and with the initiation of the rotative motion of the electrode, and wherein, after a predetermined time delay, the gas stream is started simultaneously with the return of the electrode to the initial position thereof.

4. In an oxygen scarfing machine, an arrangement for initiating an oxygen scarfing process during the movement of the workpiece to be scarfed relative to the scarfing machine, said arrangement comprising a movable, consumable electrode for forming a deposit of metal on the workpiece, feeding means for feeding said electrode towards a selected point on the workpiece in a direction opposite to the movement of the workpiece relative to the machine, melting control means for causing melting of said electrode to form a deposit of high temperature metal at said selected point, a holder for said electrode, and means for moving said electrode holder relative to the workpiece in the same direction as the movement of the workpiece relative to the scarfing machine so that said electrode maintains contact with the said selected point on the workpiece during the movement of the workpiece relative to the scarfing machine such that continuous melting of a portion of said electrode causes the formation of a deposit of the electrode material at the said selected point during the movement of the workpiece relative to the scarfing machine.

5. An arrangement as claimed in claim 4 further comprising an oxygen nozzle, and control means for controlling the movement of the holder and the operation of the oxygen nozzle, said holder, said nozzle, and said control means being mounted on a carriage movable alongside the workpiece.

6. An arrangement as claimed in claim 4 further comprising means for pivotably supporting said electrode holder to permit rotative motion thereof relative to the workpiece, rotative motion control means for causing pivoting of said electrode holder toward the workpiece at a speed approximately equal to the speed of the relative movement between the workpiece and the scarfing machine, oxygen supply control means for controlling the supply of oxygen for scarfing, and an electrical control circuit for controlling said feeding means, said melting control means, and said rotative motion control means such that the feeding of said electrode is begun simultaneously with the energization of said melting control means and with the initiation of the rotative motion of said electrode holder toward the workpiece, and for controlling said oxygen supply control means, said melting control means, and said rotative motion control means such that the melting of said electrode is interrupted simultaneously with the initiation of an oxygen stream and with the return of the electrode holder to the initial position thereof.

* * * * *